United States Patent [19]
Rust et al.

[11] Patent Number: 6,056,306
[45] Date of Patent: *May 2, 2000

[54] FOLDABLE COMPACT MOLDED STROLLER AND TRAILER WITH FLEXIBLE HITCH

[75] Inventors: Matthew H. Rust, River Falls, Wis.; Richard H. Jacobs, Minneapolis, Minn.

[73] Assignee: InSTEP, LLC, Bloomington, Minn.

[*] Notice: Under 35 U.S.C. 154(b), the term of this patent shall be extended for 76 days.

[21] Appl. No.: 08/629,727

[22] Filed: Apr. 9, 1996

[51] Int. Cl.$^7$ ..................................................... B62B 7/12
[52] U.S. Cl. ........................ 280/204; 280/47.38; 280/756
[58] Field of Search ........................ 280/204, 30, 415.1, 280/47.38, 756, 648, 650, 656, 657, 658

[56] References Cited

U.S. PATENT DOCUMENTS

| | | |
|---|---|---|
| D. 204,254 | 4/1966 | Cerf . |
| D. 206,116 | 11/1966 | Hughes . |
| D. 274,714 | 7/1984 | Cone . |
| D. 290,825 | 7/1987 | Mathies et al. . |
| D. 297,525 | 9/1988 | Baechler . |
| D. 301,850 | 6/1989 | Clement et al. . |
| D. 315,885 | 4/1991 | Jacobs . |
| 699,186 | 5/1902 | Katzke . |
| 716,972 | 12/1902 | Whitmore et al. . |
| 2,425,688 | 8/1947 | Schulte . |
| 2,455,119 | 11/1948 | Hall . |
| 2,781,225 | 2/1957 | Heideman . |
| 3,052,480 | 9/1962 | Sanstrom . |
| 3,110,504 | 11/1963 | Myers . |
| 3,305,244 | 2/1967 | Flagg . |
| 3,403,744 | 10/1968 | Dinkel . |
| 3,575,461 | 4/1971 | Goldman et al. . |
| 3,605,929 | 9/1971 | Rolland . |
| 3,656,777 | 4/1972 | Keiser, Jr. . |
| 3,698,502 | 10/1972 | Patin . |
| 3,712,636 | 1/1973 | Gesslein . |
| 3,781,031 | 12/1973 | Patin . |
| 3,848,890 | 11/1974 | MacAlpine . |
| 3,873,116 | 3/1975 | Perego . |
| 3,877,723 | 4/1975 | Fabey et al. . |
| 3,909,043 | 9/1975 | Black . |
| 4,029,329 | 6/1977 | Chambers . |
| 4,064,957 | 12/1977 | Parham . |
| 4,072,318 | 2/1978 | Laune . |
| 4,166,630 | 9/1979 | Sullivan et al. . |
| 4,181,317 | 1/1980 | Toda . |

(List continued on next page.)

FOREIGN PATENT DOCUMENTS

| | | |
|---|---|---|
| 589480 | 3/1994 | European Pat. Off. ............... 280/204 |
| 2579544 | 10/1986 | France . |
| 213538 | 9/1909 | Germany . |
| 2348716 | 7/1974 | Germany . |
| 2741543 | 6/1978 | Germany . |
| 3435575 | 4/1986 | Germany . |
| 851163 | 10/1960 | United Kingdom . |
| 2099765A | 12/1982 | United Kingdom . |
| 2204282A | 11/1988 | United Kingdom . |

OTHER PUBLICATIONS

Cannondale Bicycle Trailer Seat 280/284 Oct. 10, 1990.

Primary Examiner—Paul N. Dickson
Attorney, Agent, or Firm—Mackall, Crounse & Moore, PLC

[57] ABSTRACT

A foldable compact molded stroller and trailer with flexible hitch comprises a rigid plastic molded shell with a rear axle end for supporting two large diameter wheels and a front fork end removably supporting alternatively a front wheel for use in the stroller mode and a trailer cycle hitch assembly attachable to the frame portion of a cycle for use in the trailer mode. The rigid plastic molded shell is conformed into a side-by-side two child holder seat portion with side, rear and front portions for substantially enclosing two forward facing children. A foldable handle is attached to the rear portion of the shell for use in stroller mode. The trailer and stroller combination further includes a foldable roll bar to add further protection of the children. The trailer cycle hitch assembly includes a flexible cycle hitch attachable to a bicycle's rear adjacent horizontal and inclined frame rods.

15 Claims, 13 Drawing Sheets

U.S. PATENT DOCUMENTS

| | | |
|---|---|---|
| 4,325,449 | 4/1982 | D'Addio et al. . |
| 4,335,900 | 6/1982 | Fleischer . |
| 4,346,912 | 8/1982 | Habib . |
| 4,353,567 | 10/1982 | Weldy . |
| 4,361,338 | 11/1982 | Kuchenbecker et al. . |
| 4,369,987 | 1/1983 | Witherell . |
| 4,373,740 | 2/1983 | Hendrix . |
| 4,403,673 | 9/1983 | Ball . |
| 4,408,776 | 10/1983 | Randolph et al. . |
| 4,422,663 | 12/1983 | Hon . |
| 4,526,390 | 7/1985 | Skolnik . |
| 4,542,915 | 9/1985 | Wheeler, III et al. . |
| 4,586,721 | 5/1986 | Harada et al. . |
| 4,606,550 | 8/1986 | Cone . |
| 4,618,184 | 10/1986 | Harvey . |
| 4,632,420 | 12/1986 | Miyagi . |
| 4,741,551 | 5/1988 | Perego . |
| 4,756,541 | 7/1988 | Albitre . |
| 4,828,278 | 5/1989 | Nakao et al. . |
| 4,831,689 | 5/1989 | Lo . |
| 4,902,027 | 2/1990 | Skelly . |
| 4,934,728 | 6/1990 | Chen . |
| 4,953,880 | 9/1990 | Sudakoff et al. . |
| 4,993,743 | 2/1991 | Takahashi et al. . |
| 5,029,891 | 7/1991 | Jacobs . |
| 5,039,120 | 8/1991 | Stowe . |
| 5,076,599 | 12/1991 | Lockett et al. . |
| 5,087,066 | 2/1992 | Mong-Hsing . |
| 5,123,670 | 6/1992 | Chen . |
| 5,133,567 | 7/1992 | Owens ..................... 280/650 |
| 5,176,395 | 1/1993 | Garforth-Bles . |
| 5,205,577 | 4/1993 | Liu . |
| 5,207,439 | 5/1993 | Mortenson . |
| 5,224,720 | 7/1993 | Chaw et al. ............... 280/650 |
| 5,242,178 | 9/1993 | Galasso et al. ........... 280/204 |
| 5,257,799 | 11/1993 | Cone et al. . |
| 5,259,634 | 11/1993 | Berner et al. . |
| 5,265,891 | 11/1993 | Diehl . |
| 5,301,963 | 4/1994 | Chen . |
| 5,308,096 | 5/1994 | Smith . |
| 5,356,171 | 10/1994 | Schmidlin et al. . |
| 5,460,395 | 10/1995 | Chen . |
| 5,503,430 | 4/1996 | Miki et al. ............... 280/756 |
| 5,522,614 | 6/1996 | Eyman et al. . |
| 5,538,267 | 7/1996 | Pasin et al. ............ 280/47.35 |
| 5,599,033 | 2/1997 | Kolbus et al. ............ 280/204 |

FOLDABLE COMPACT MOLDED STROLLER AND TRAILER WITH FLEXIBLE HITCH

BACKGROUND OF THE INVENTION

This invention relates generally to wheeled infant carriers, and more particularly to a conveniently transportable infant stroller for safely and smoothly carrying two infants or children. The stroller is also uniquely convertible to an infant or child trailer for safely and smoothly carrying two children pulled behind a cycle, such as a bicycle.

With the resurgence of physical fitness, persons of all ages, including the parents of infants and young children, have developed great interest in all forms of physical exercise, particularly in jogging and walking at relatively high speeds and the riding of bicycles. Infant jogging strollers are generally shown in U.S. Pat. Nos. Des. 297,525; 4,934,728; 4,953,880; Des. 315,885; and 5,029,891.

Collapsible or foldable baby carriages for walking have long been known and are generally described in U.S. Pat. Nos. 2,781,225; 3,873,116; and 4,072,318. These early carriages have evolved from more cumbersome rigid carriages, as many carriages are now collapsible or foldable as to make them conveniently transported or stored. These carriages are generally prescribed for one child or infant.

Infant trailers for pulling behind a cycle have recently been developed. These trailers are cumbersome, suitable for trailer purposes only and generally permit the carrying of only a single infant or child. Furthermore, many of these trailers pull an infant facing rearwardly, which can be quite scary to the infant or child as he or she does not know where they are going but only where they have been. Furthermore, these carriages in the form of cycle trailers are generally not safe as they may easily be flipped over or become disconnected without the knowledge of the bicycle operator who is facing forward until the problem has occurred.

There is a need for an infant or child foldable compact molded stroller and trailer with flexible hitch which includes all the past known refinements of strollers and trailers but further includes the ability to carry two infants or children facing forwardly in a completely safe environment in a smooth fashion at relatively higher speeds than simple jogging or walking.

SUMMARY OF THE INVENTION

A foldable compact molded stroller and trailer with flexible hitch comprises a rigid plastic molded shell with a rear axle end for supporting two large diameter wheels and a front fork end removably supporting alternatively a front wheel for use in the stroller mode and a trailer cycle hitch assembly attachable to the frame portion of a cycle for use in the trailer mode. The rigid plastic molded shell is conformed into a side-by-side two child holder seat portion with side, rear and front portions for substantially enclosing two forward facing children. A foldable handle is attached to the rear portion of the shell for use in stroller mode. The trailer and stroller combination further includes a foldable roll bar to add further protection of the children. The trailer cycle hitch assembly includes a flexible cycle hitch attachable to a bicycle's rear adjacent horizontal and inclined frame rods.

A principle object and advantage of the present invention is that the foldable compact molded stroller and trailer with flexible hitch provides a smooth and safe ride for two infants or children carried in either the trailer mode or stroller mode at relatively higher speeds as opposed to walking or jogging at approximately three to four miles per hour.

Another object and advantage of the present invention is that the trailer mode of the foldable compact molded stroller and trailer with flexible hitch permits the two children or infants to face forwardly during motion to permit them to see where they are going and to prevent motion sickness and fear or feeling of loss of control.

Another object and advantage of the present invention is that the plastic molded shell, which forms the two child holder seat portion, has upwardly extending front, rear and side portions as to completely protect the children carried therein from the hazards of the rotating wheels and possible flying debris kicked up from the wheels which may strike children.

Another object and advantage of the present invention is that the foldable compact molded stroller and trailer with flexible hitch has a roll bar in combination with seat belts to safely protect the children should an accident occur and the stroller or trailer be flipped over on its top while the children are safely kept secured within the confines of the forward, rear and side portions of the plastic molded shell with the assistance of the seatbelts.

Another object and advantage of the present invention is that the foldable compact molded stroller and trailer with flexible hitch quickly and easily converts to and from the trailer mode as well as from and to the stroller mode with minimum effort.

Another object and advantage of the present invention is that the foldable compact molded stroller and trailer with flexible hitch has a removable trailer hitch assembly which permits pivotal movement of the assembly permitting a safe and smooth ride as the bicycle turns left or right and goes over slight curves and the like.

Another object and advantage of the present invention is that the foldable compact molded stroller and trailer with flexible hitch has both a foldable handle and a foldable roll bar which when folded down creates a very compact package which can easily be fit into a car trunk for transporting.

DETAILED SPECIFICATION

The foldable compact molded stroller and trailer with flexible hitch 10 may generally be seen in FIGS. 1 through 10 and 14 and generally includes a plastic molded shell 70. The plastic molded shell 70 has attached to it a rear axle end 38 which supports large diameter rear wheels 42 and a front fork end 48 which supports a front wheel 60 when in the stroller mode. When in the trailer mode, a flexible trailer hitch assembly 120 is utilized, see FIGS. 1 and 14. A foldable handle 94 is utilized when in the jogging stroller mode and is folded down when used in the trailer mode or for storage. A foldable roll bar 90 extends upwardly from the side portions of the shell 70 and is locked in place to protect the children.

More specifically, the plastic molded shell's 70 rear axle end 38 includes two rear axle supports 36. The rear axle supports 36 serve to support the rear wheels 42 by way of an axle, bolt and nut arrangement 44 which suitably may be of the "drop-out" type, see particularly FIGS. 4 and 6. The plastic molded shell 70 further has a front fork end 48 which includes a fork frame 50 secured to the shell 70 by way of a four bolt and nut arrangement 46. The fork frame 50 has two forwardly directed forks 52 with dual prongs 54 therein for supporting a front wheel 60 by way of an axle, bolt and nut arrangement 62 which also suitably may be of the "drop-out" type, see particularly FIGS. 3 and 6.

The plastic molded shell 70 is suitably made of polyethylene. The shell 70 has a contoured side-by-side two forward facing child seat holder portion 72 with seatbelts 74 therein. The shell 70 has an upwardly extending rear portion 76 which forms the backrest for the children. The shell 70 also has opposing upwardly extending side portions 76 which curve to downward side portions 80 which surround the rear wheels 42 protecting the children from the rear wheels 42 and flying debris. The shell 70 also has an upwardly extending front portion 84 which then curves to a downward front portion 86 creating a protective shield which also helps to protect from flying debris. Centrally dividing the front portions 84, 86 is a front fork fender 88 which further protects riding children from debris. Located directly behind the fender 88 is a recessed tray 88 which can serve to hold a number of items such as toys, snacks, money or beverages.

Located at the juncture of the upward and downward side portions 78 and 80, at approximately the mid-point of the shell 70, is a foldable roll bar 90 hingedly bolted 92 to the shell 70. The roll bar 90, when extended, is locked in place by locking latches 98 and extends upwardly and across the top of the shell 70 to protect the children within should the invention tip over. Towards the rear of the shell, at the juncture of the upward and downward side portions 78 and 80, a foldable handle bar 94 is hingedly bolted 92. The handle bar 94 may suitably be padded 96 and is secured by locking latches 98. Both the roll bar 90 and handle bar 94 may be unlatched and folded down for easy storage or car trunk transportation, see particularly FIG. 10. At the very rear of the shell 70, just off the upward extending rear portion 76 is located a loop of fabric, suitably of a very durable quality such as nylon or leather, serving as a front wheel storage holder 75 for trailer operation.

Figure 1:
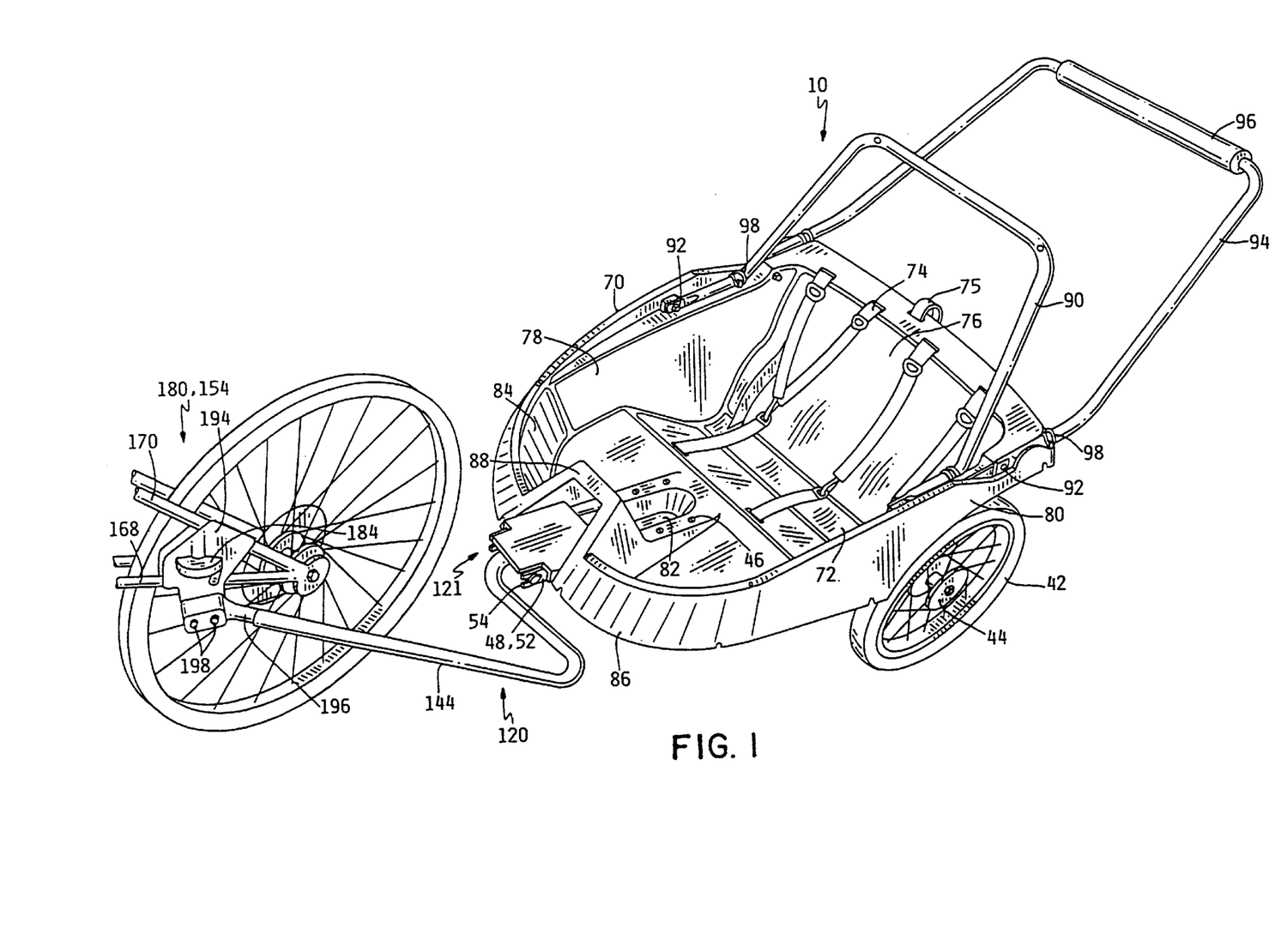
FIG. 1 is a perspective view of the foldable compact molded stroller and trailer with flexible hitch in the trailer mode.
Figure 2:
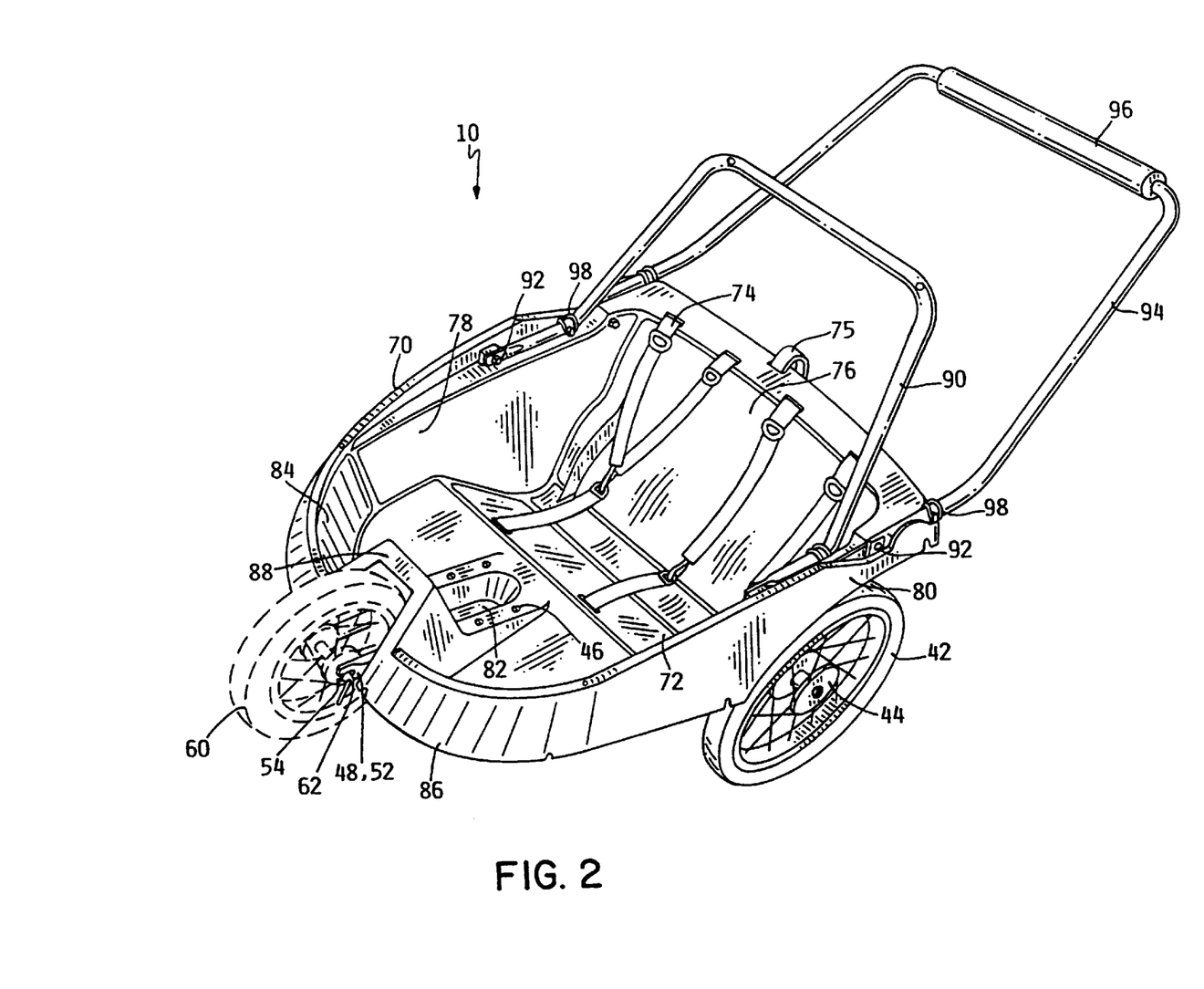
FIG. 2 is a perspective view of the invention in the jogging stroller mode, the attachable front wheel shown in phantom.
Figure 3:
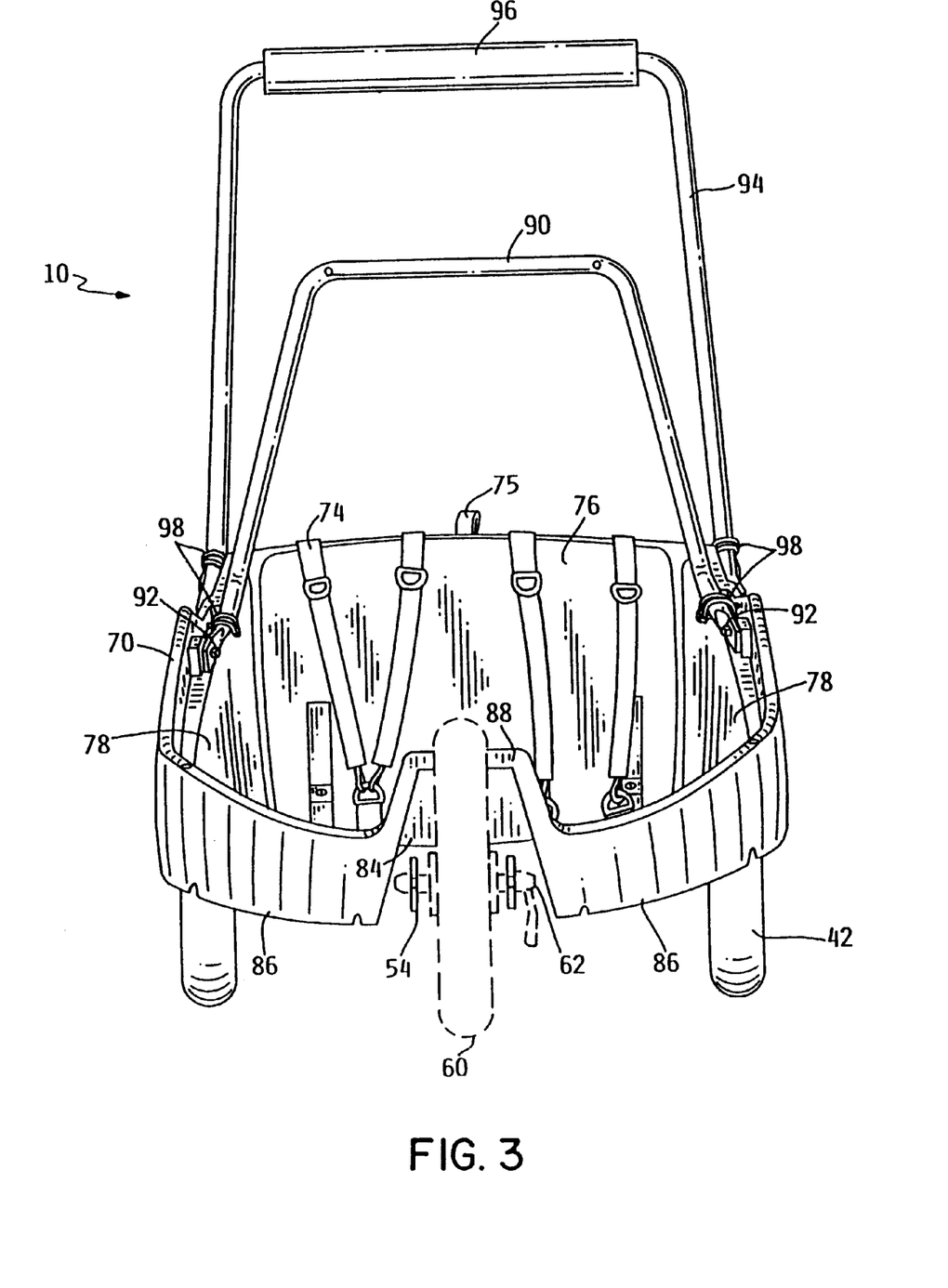
FIG. 3 is a front elevational view of the invention in the jogging stroller mode, the attachable front wheel shown in phantom.
Figure 4:
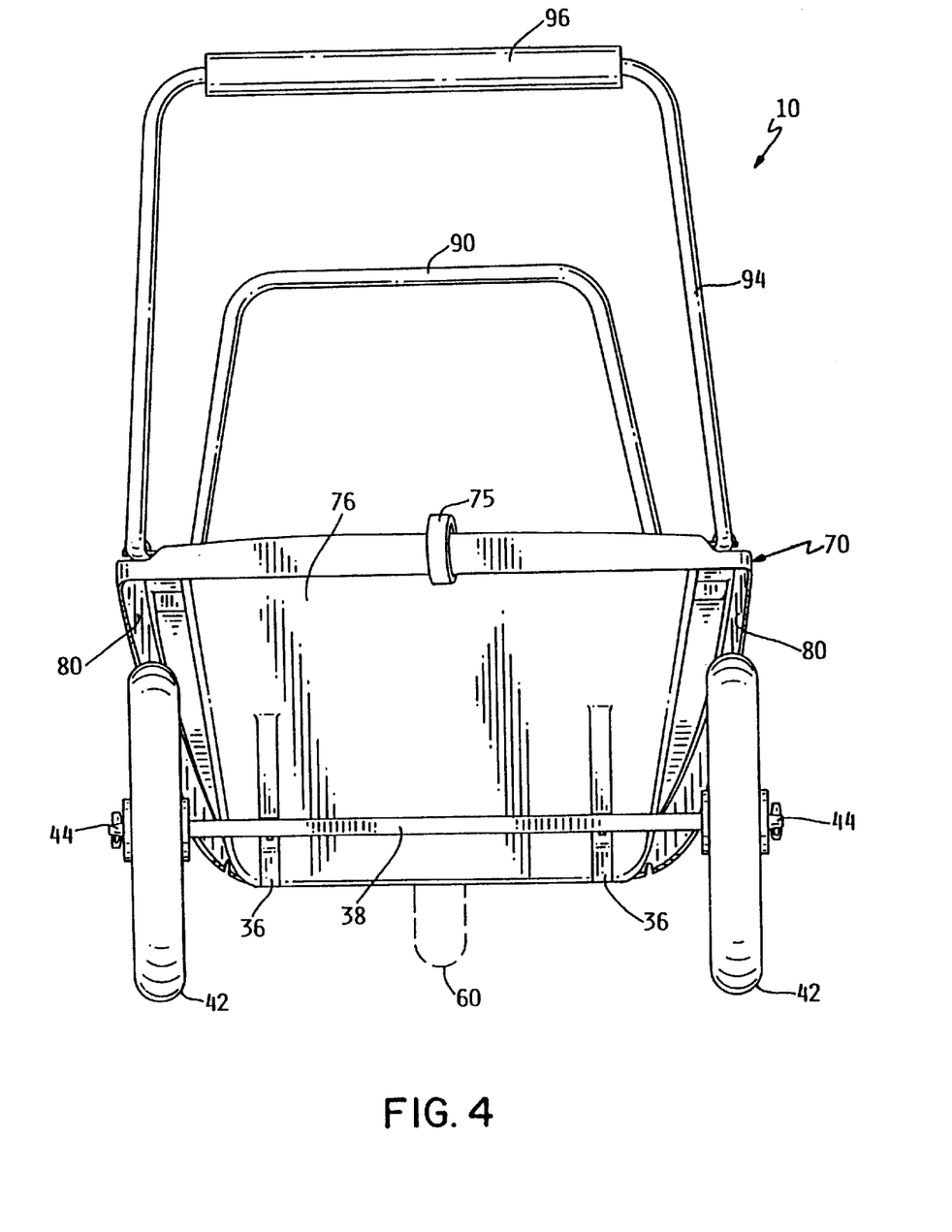
FIG. 4 is a rear elevational view of the invention in the jogging stroller mode, the attachable front wheel shown in phantom.
Figure 5:
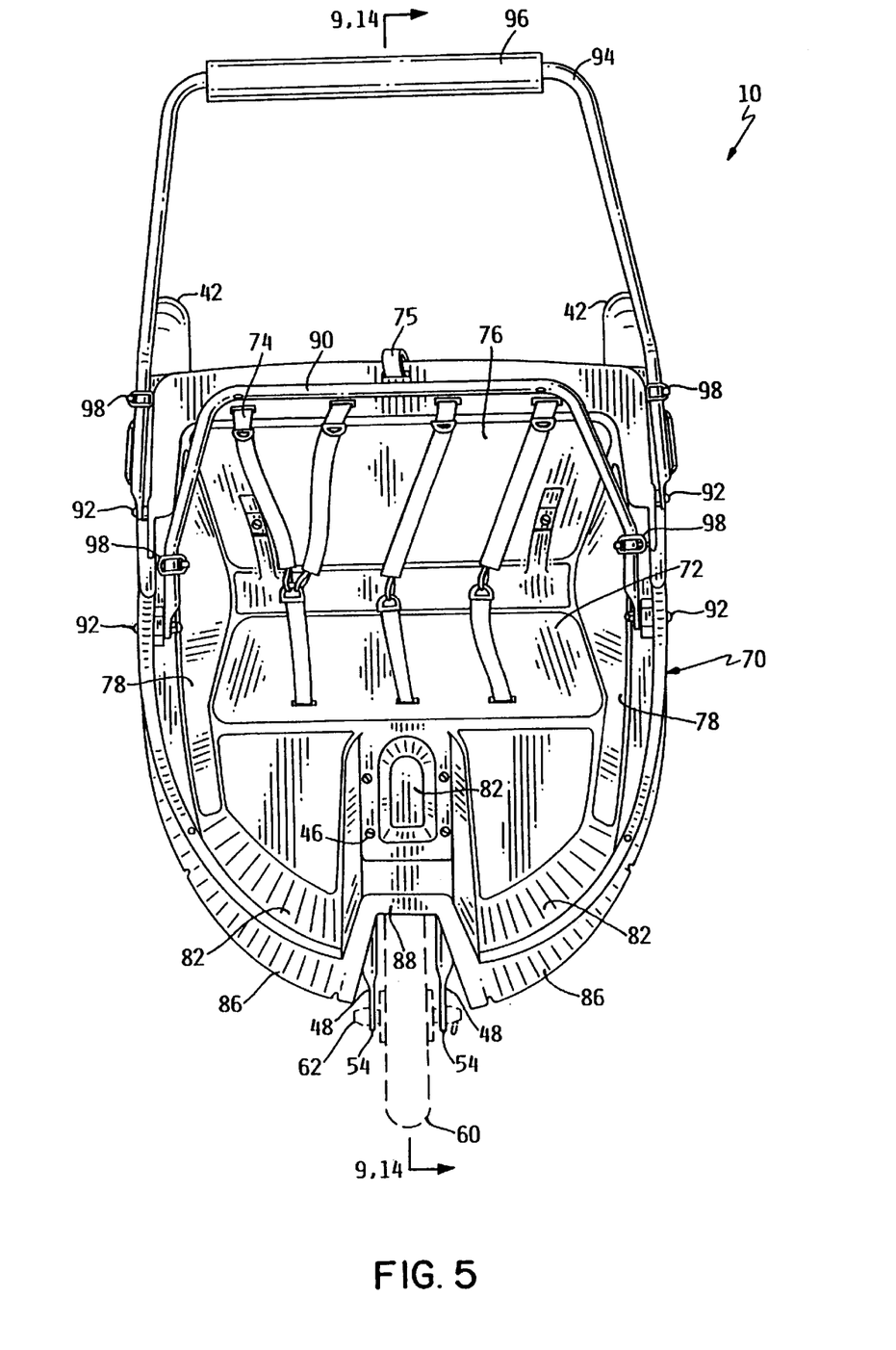
FIG. 5 is a top plan view of the invention in the jogging stroller mode, the attachable front wheel shown in phantom.
Figure 6:
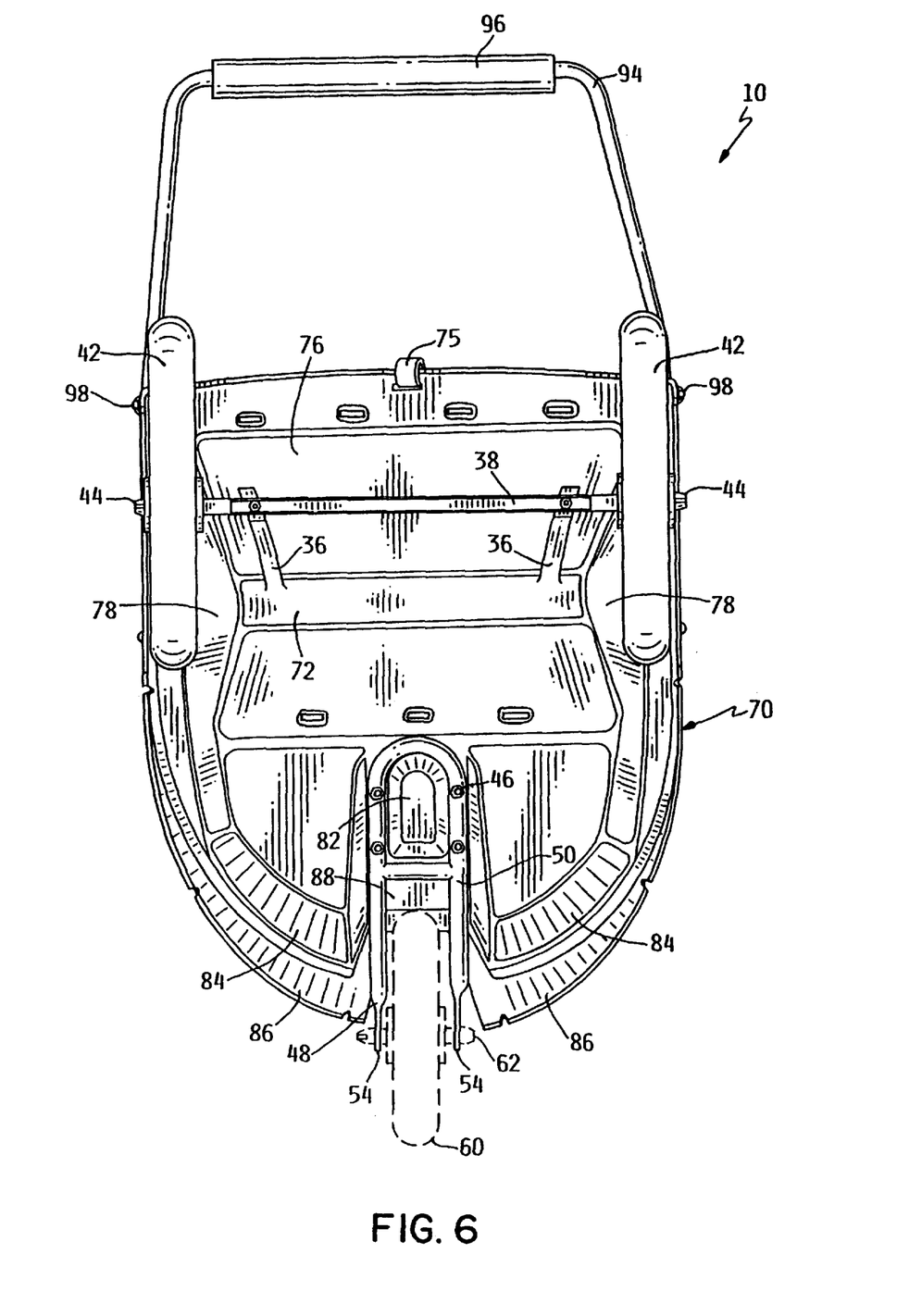
FIG. 6 is a bottom plan view of the invention in the jogging stroller mode, the attachable front wheel shown in phantom.
Figure 7:
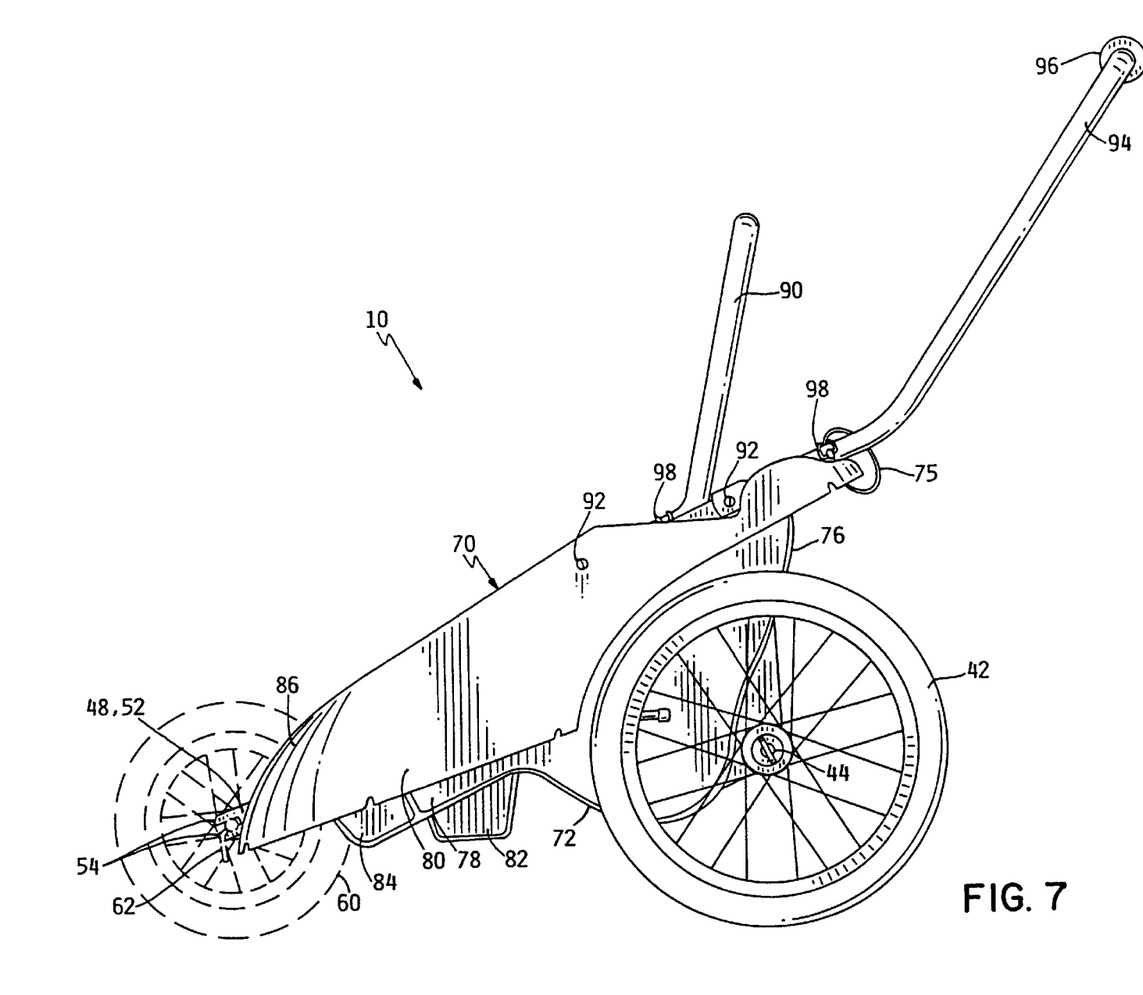
FIG. 7 is a side elevational view of the invention in the jogging stroller mode, the attachable front wheel shown in phantom.
Figure 8:
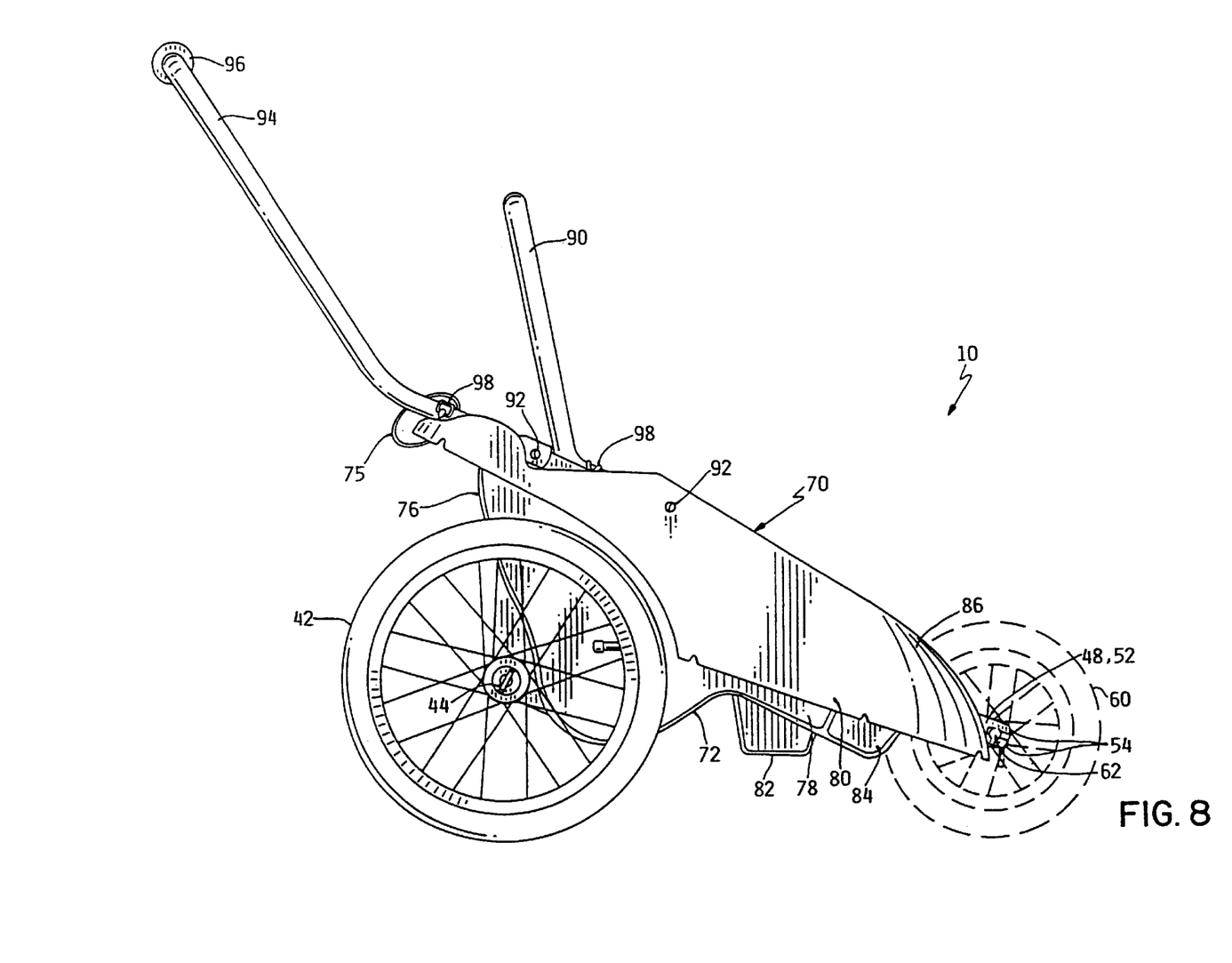
FIG. 8 is a side elevational view, opposite to FIG. 7, of the invention in the jogging stroller mode, the attachable front wheel shown in phantom.
Figure 9:
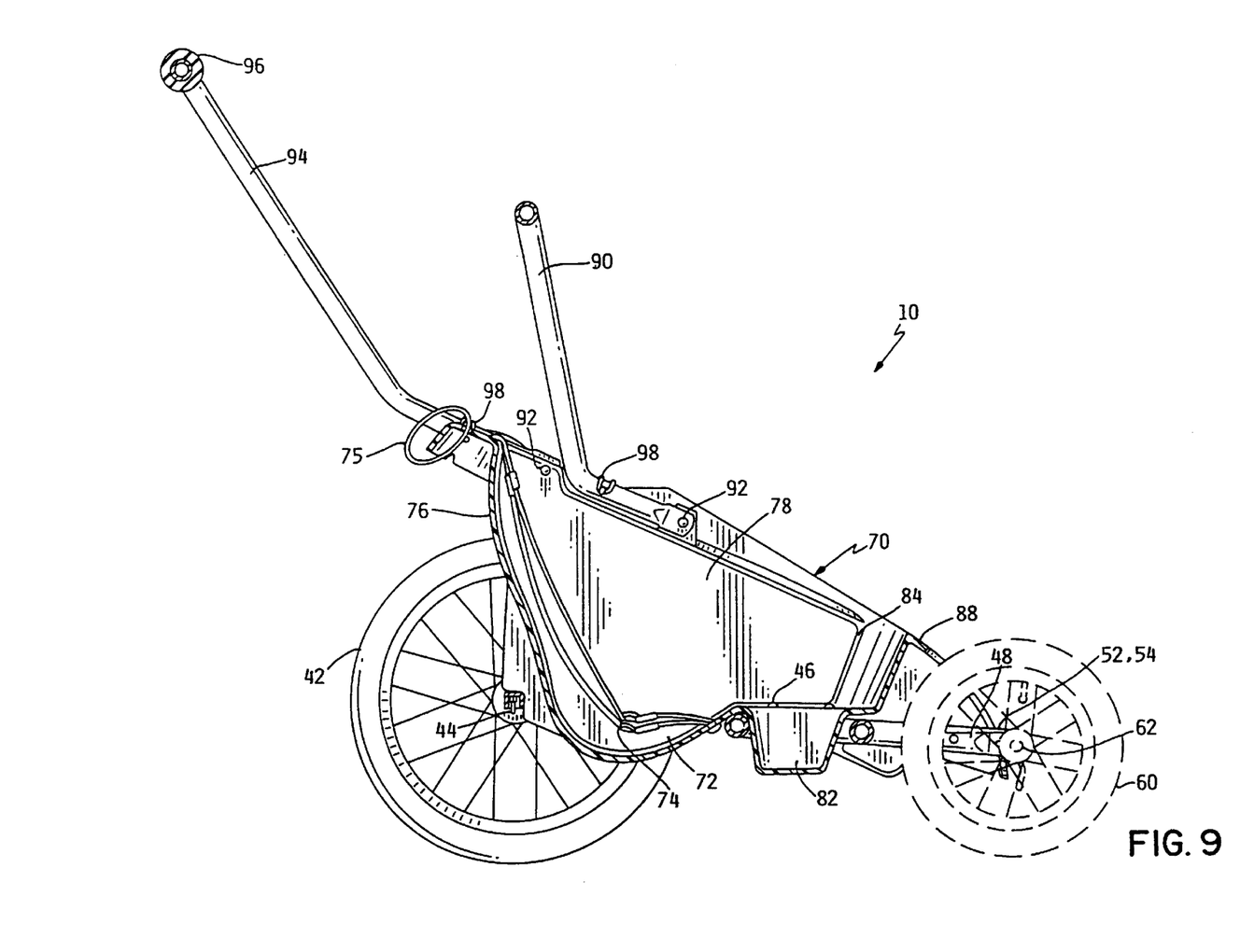
FIG. 9 is a sectional view of the invention in the jogging stroller mode, the attachable front wheel shown in phantom, taken along 9—9 of FIG. 5.
Figure 10:
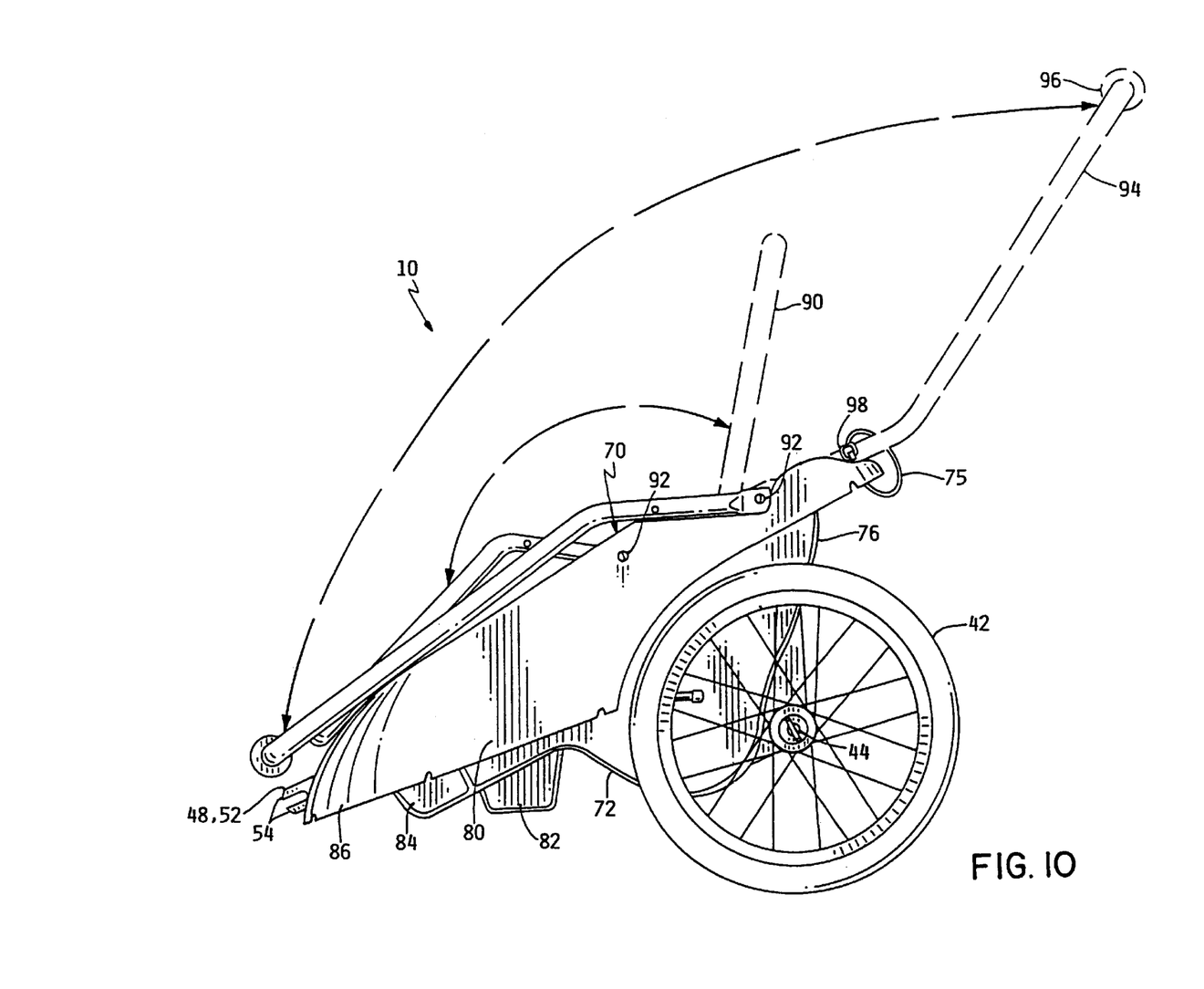
FIG. 10 is a side elevational view of the invention depicting the folding ability of the roll bar and handle bar.
Figure 14:
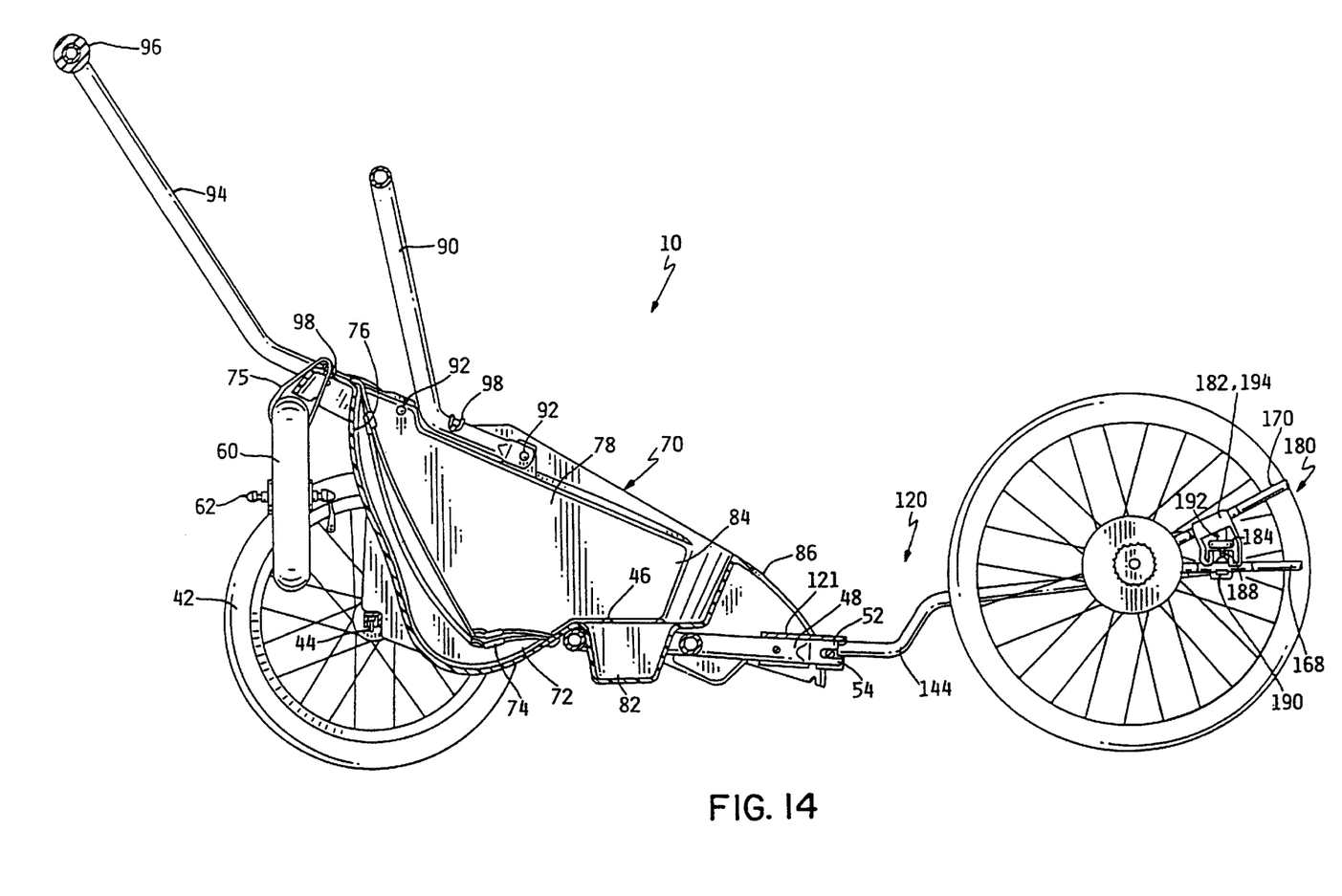
FIG. 14 is a side elevational view of the invention in the trailer mode, the stroller/trailer itself is shown in a sectional view similar to FIG. 9.

Specifically shown in FIGS. 1 and 14, the flexible trailer hitch assembly 120 may be appreciated. The hitch assembly 120 includes a removable trailer attachment end 121. Extending upwardly from the attachment end 121 is a yoke 144 which terminates in a cycle hitch end 154. The cycle hitch end 154 attaches to a bicycle by way of a flexible cycle hitch 180.

Figure 11:
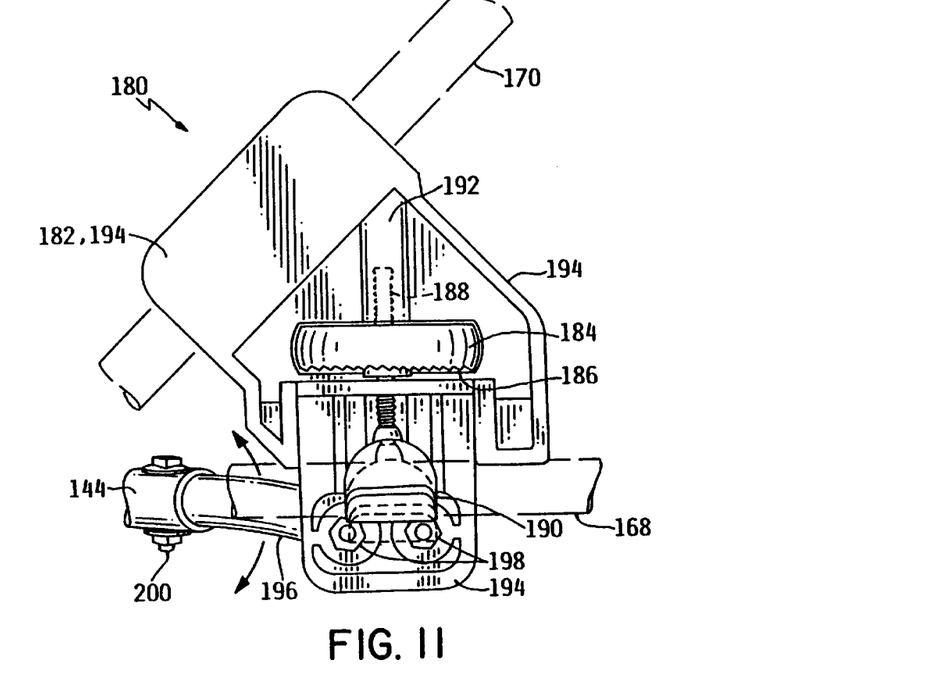
FIG. 11 is a side elevational view of the invention's bicycle trailer hitch assembly.
Figure 12:
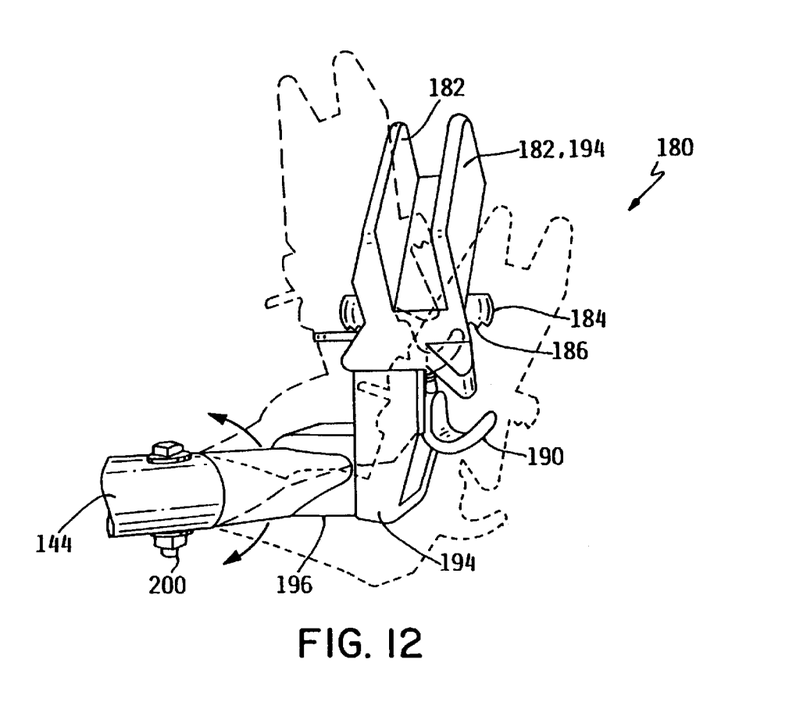
FIG. 12 is a perspective view of the invention's bicycle trailer hitch assembly depicting the hitch's flexibility in phantom.
Figure 13:
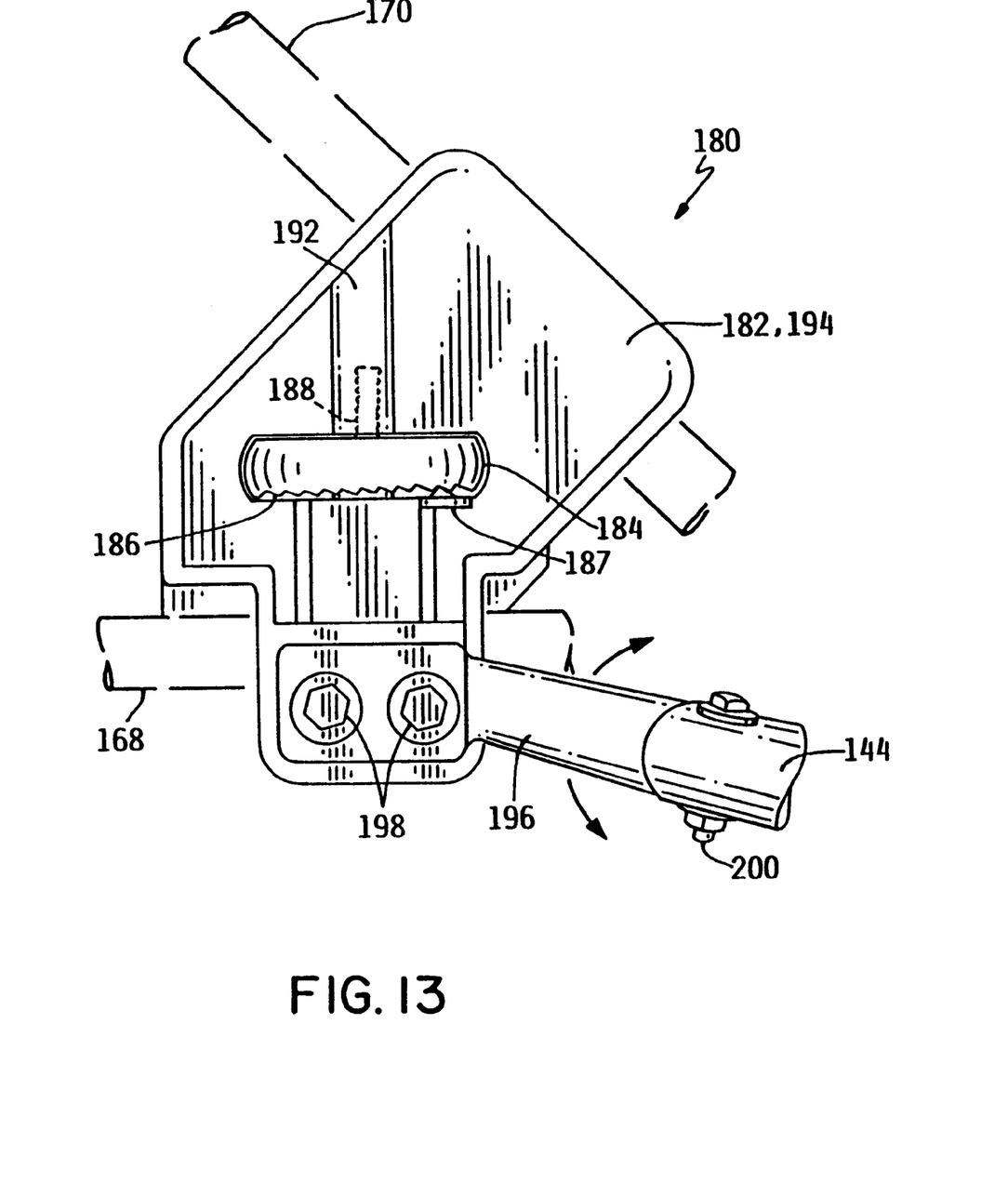
FIG. 13 is a side elevational view, opposite to FIG. 11, of the invention's bicycle trailer hitch.

The flexible cycle hitch 180 may be seen in detail in FIGS. 11 through 13. The cycle hitch 180 generally includes a hitch casing 194, a screw knob 184 and a tightening lip 190. To attach the cycle hitch 180 to a bicycle the hitch casing 194 is slid underneath and around the bicycle's incline frame member 170 so that the incline frame member holder 182 is substantially encasing the bicycle's incline frame member 170; the tightening lip 180 is in a lowered position. With the hitch casing 194 in place, the screw knob 184 can be turned so as to cause the screw 188 to turn within its shaft 192 and raise the attached tightening lip 190. The tightening lip 190 is raised until it is secure and tight about the bicycle's horizontal frame member 170. The screw knob 184 is equipped with ratchet teeth 186 which travel over an opposing ratchet teeth plate 187 operating to hold the screw 188 and its attached tightening lip 190 securely in place; the plate 187 must be depressed to loosen the tightening lip 190. Attached to the hitch casing 194 by a two bolt and nut arrangement 198 is a yoke extension 196 serving as the link between the yoke 144 and the cycle hitch 180 itself. The yoke extension 196 and yoke 144 are connected by way of a bolt and nut arrangement 200. The hitch casing 194, tightening lip 180 and yoke extension 196 are made of a durable, high strength, yet flexible material such as KRATON® G Polymers or EMPILON® which are thermoplastic elastomers. These thermoplastic elastomers are designed specifically for the production of molded and extruded products. They are made by Shell Chemical and are available from GLS Plastics of 740B Industrial Drive, Cary, Ill. 60013. The flexible material allows the hitch to pivot, see FIG. 12, providing a smoother, safer ride for the trailer and its occupants at relatively higher speeds as the cycle turns corners and goes over obstacles.

Operation of the foldable compact molded stroller and trailer with flexible hitch may now be appreciated. In the stroller mode, the front fork end 48 supports the front wheel 60 by the axle arrangement 62. The handle bar 94 is folded upward on its bolt hinges 92 as is the roll bar 90 on its bolt hinges 92; both are secured by locking latches 98. The stroller is now in condition for operation.

Disengaging the locking latches 98 permits the downward folding of the handle bar 94. The axle arrangement 62 may next be released, the front wheel 60 removed and stored in its storage holder 75. Thereafter, the removable trailer attachment end 121 of the trailer hitch assembly 120 may be secured to the prongs 54 of the front fork end 48 or fork 52. Thereafter, the cycle hitch end 154 may be secured to the incline 170 and horizontal 168 frame members of the bicycle frame thus enabling the trailer mode of operation.

The present invention may be embodied in other specific forms without departing from the spirit of essential attributes thereof; therefore, the illustrated embodiment should be considered in all respects as illustrative and not restrictive, reference being made to the appended claims rather than to the foregoing description to indicate the scope of the invention.

What is claimed is:

1. A foldable compact molded stroller and trailer with flexible hitch comprising:
   (a) a rigid plastic molded shell conformed into a side-by-side two child holder seat portion with side, rear and front portions for substantially enclosing two forward facing children, the shell having attached a rear axle end for supporting two large diameter rear wheels and a front fork end removably supporting alternatively a front wheel for use in the stroller mode and a trailer cycle hitch assembly attachable to a rear frame portion of a cycle for use in the trailer mode;
   (b) a foldable handle hingedly attached to the shell for use in the stroller mode;
   (c) a foldable roll bar extendable upward and hingedly attached to the shell for use in both the stroller and trailer mode; and
   (d) the trailer cycle hitch further comprising a flexible hitch comprising a hitch casing, a tightening lip and a tightening means for raising and lowering the tightening lip, the flexible hitch is attachable between the rear, adjacent horizontal and inclined members of a bicycle frame.

2. The foldable compact molded stroller and trailer with flexible hitch of claim 1, further comprising a trailer hitch assembly having a removable trailer attachment end attachable to the front fork end and a substantially horizontal yoke portion extending between and attached to the trailer attachment end and the flexible hitch, the flexible hitch allowing for pivotal motion thereby providing an upright, stable safe ride for the children in the trailer at relatively higher speeds as the cycle turns left and right and goes over obstacles.

3. The foldable compact molded stroller and trailer with flexible hitch of claim 1, wherein the side portions extend upwardly from the child holder seat portion and then downwardly over the rear wheels to protect the children from the rear wheels and flying debris.

4. The foldable compact molded stroller and trailer with flexible hitch of claim 1, wherein the front portion extends upwardly from the child holder seat portion and downwardly to form a protective shield to further protect the children from flying debris.

5. The foldable compact molded stroller and trailer with flexible hitch of claim 1, wherein the front portion is centrally divided by a front fender portion having outer portions extending upward from the child holder seat portion and having inner portions extending downward creating a cavity wherein the front wheel or alternatively the trailer cycle hitch assembly may be inserted, the front fender portion additionally serving to protect the children from flying debris.

6. The foldable compact molded stroller and trailer with flexible hitch of claim 1, wherein the two child seat holder portion of the molded shell also contains a recessed tray for holding personal items.

7. The foldable compact molded stroller and trailer with flexible hitch of claim 1, further comprising seat belts on the child holder seat portion.

8. The foldable compact molded stroller and trailer with flexible hitch of claim 1, wherein the flexible hitch is made of a thermoplastic elastomer.

9. A foldable compact molded stroller and trailer with flexible hitch comprising:
   (a) a rigid plastic molded shell conformed into a side-by-side two child holder seat portion with side, rear and front portions for substantially enclosing two forward facing children, the shell having attached a rear axle end for supporting two large diameter rear wheels and a front fork end removably supporting alternatively a front wheel for use in the stroller mode and a trailer cycle hitch assembly attachable to a frame portion of a cycle for use in the trailer mode;
   (b) a foldable handle hingedly attached to the shell for use in the stroller mode;
   (c) a foldable roll bar extendable upward and hingedly attached to the shell for use in both the stroller and trailer mode; and
   (d) a trailer hitch assembly having a removable trailer attachment end attachable to the front fork end, a substantially horizontal yoke portion extending between and attached to the trailer attachment end and the flexible hitch, and a flexible hitch comprising a hitch casing, a tightening lip and a tightening means for raising and lowering the tightening lip, the flexible hitch is attachable between the rear, adjacent horizontal and inclined members of a bicycle frame, the flexible hitch allowing for pivotal motion thereby providing an upright, stable safe ride for the children in the trailer at relatively higher speeds as the cycle turns left and right and goes over obstacles.

10. The foldable compact molded stroller with flexible hitch of claim 8, wherein the side portions extend upwardly from the child holder seat portion and then downwardly over the rear wheels to protect the children from the rear wheels and flying debris.

11. The foldable compact molded stroller with flexible hitch of claim 9, wherein the front portion extends upwardly from the child holder seat portion and downwardly to for a protective shield to further protect the children from flying debris.

12. The foldable compact molded stroller with flexible hitch of claim 8, wherein the front portion is centrally divided by a front fender portion having outer portions extending upward from the child holder seat portion and having inner portions extending downward creating a cavity wherein the front wheel or alternatively the trailer cycle hitch assembly may be inserted, the front fender portion additionally serving to protect the children from flying debris.

13. The foldable compact molded stroller with flexible hitch of claim 9, wherein the two child seat holder portion of the molded shell also contains a recessed tray for holding personal items.

14. The foldable compact molded stroller with flexible hitch of claim 9, further comprising seat belts on the child holder seat portion.

15. The foldable compact molded stroller with flexible hitch of claim 9, wherein the flexible hitch is made of a thermoplastic elastomer.

* * * * *

UNITED STATES PATENT AND TRADEMARK OFFICE
CERTIFICATE OF CORRECTION

PATENT NO. : 6,056,306
DATED : May 2, 2000
INVENTOR(S) : Matthew H. Rust and Richard H. Jacobs It is certified that error appears in the above-identified patent and that said Letters Patent is hereby corrected as shown below:

<u>Title page,</u>
Please insert the following: Related U.S. Application Data,

-- continuation-in-part application of a design patent application Serial No. 29/049,108 filed on January 17, 1996, which is a continuation -in-part of U.S. patent application Serial No. 08/114,783 filed on August 30, 1993 --.

<u>Column 6,</u>
Line 34, please delete the numeral "8", and insert in its place -- 9 --.
Line 44, please delete the numeral "8", and insert in its place -- 9 --.

Signed and Sealed this

Tenth Day of September, 2002

Attest:

Attesting Officer

JAMES E. ROGAN
Director of the United States Patent and Trademark Office